United States Patent

[11] 3,620,417

[72] Inventor John A. Simms
Wilmington, Del.
[21] Appl. No. 878,324
[22] Filed Nov. 20, 1969
[45] Patented Nov. 16, 1971
[73] Assignee E. I. du Pont de Nemours and Company
Wilmington, Del.

[54] PACKAGE-DISPENSING DEVICE
4 Claims, 2 Drawing Figs.

[52] U.S. Cl. .................................................. 222/136
[51] Int. Cl. .................................................. B67d 5/52
[50] Field of Search ........................................... 222/136,
94, 386, 103

[56] References Cited
UNITED STATES PATENTS
3,188,056 6/1965 Trumbull et al. ............. 222/136 X
3,323,682 6/1967 Creighton, Jr. et al. ...... 222/94

Primary Examiner—Samuel F. Coleman
Assistant Examiner—Norman L. Stack, Jr.
Attorney—John E. Griffiths ABSTRACT: A device capable of containing and dispensing a plurality of separate extrudible materials which comprises:
a. a hollow casing having an orifice at each end;
b. at least one flexible duct being longitudinally disposed inside the casing, one end of said duct being sealed and attached to the casing at a point near one of the orifices of the casing, and the other end of said duct having an orifice which is inserted in the other orifice of the casing;
c. a plunger that is inserted in the orifice of the casing near which the duct is attached, said plunger having its outside periphery in close proximity to the inside walls of the casing so as to form a seal therewith; and
d. means capable of moving said plunger to the opposite end of the casing thereby simultaneously (1) causing the expulsion of the extrudible materials contained in the casing and (2) compressing the flexible duct and causing the expulsion of the extrudible materials contained therein.

PATENTED NOV 16 1971 3,620,417

INVENTOR
JOHN A. SIMMS

BY *John E. Griffiths*
ATTORNEY

PACKAGE-DISPENSING DEVICE

BACKGROUND OF THE INVENTION

1. Field of the Invention

This invention relates to a device capable of containing and dispensing a plurality of separate extrudible materials.

2. Description of the Prior Art

As is known in the art certain materials must be kept separate until they are admixed just prior to use. Examples of these materials include bonding agents such as epoxy resins wherein a curing agent must be admixed with the epoxy resin, sealers that require an admixture of two or more materials, and filler materials such as are often used to repair dents and rusted portions of automobile bodies.

In the above multicomponent systems, if desirable results are to be obtained, normally the ratios of the materials must be controlled carefully. For example, to produce an infusible, tough reaction product of an epoxy resin and a curing agent, ordinarily one must use the proper amount of the epoxy and curing agent.

Prior attempts to create a device that would contain and accurately dispense required amounts of the above-mentioned materials have not been entirely successful. As examples of deficiencies of these prior art devices there may be mentioned (a) often only limited ratios of materials can be dispensed (b) often all the contained materials have to be used at one time and (c) often air is introduced into the materials which is undesirable in some applications such as in auto body filler.

SUMMARY OF THE INVENTION

According to the present invention there is provided:

A device capable of containing and dispensing a plurality of separate extrudible materials which comprises:
a. a hollow casing having an orifice at each end;
b. at least one flexible duct being longitudinally disposed inside the casing, one end of said duct being sealed and attached to the casing at a point near one of the orifices of the casing, and the other end of said duct having an orifice which is inserted in the other orifice of the casing;
c. a plunger that is inserted in the orifice of the casing near which the duct is attached, said plunger having its outside periphery in close proximity to the inside walls of the casing so as to form a seal therewith; and
d. means capable of moving said plunger to the opposite end of the casing thereby simultaneously (1) causing the expulsion of the extrudible materials contained in the casing and (2) compressing the flexible duct and causing the expulsion of the extrudible materials contained therein.

It has been found that the device of the present invention can dispense a wide variety of ratios of materials merely by varying the size of the casing and the flexible duct. Furthermore, the user of the device of this invention, if desired, can dispense only a portion of the materials that are contained in the device. Moreover, said device does not introduce air into the contained materials, which may be undesirable in some applications.

BRIEF DESCRIPTION OF THE DRAWINGS

The drawings illustrate a preferred embodiment of this invention; a side view of it is shown in FIG. 1 and an end view of it is shown in FIG. 2.

DESCRIPTION OF THE PREFERRED EMBODIMENTS

The invention can be understood more clearly by reference to the accompanying drawings.

Figure 1:
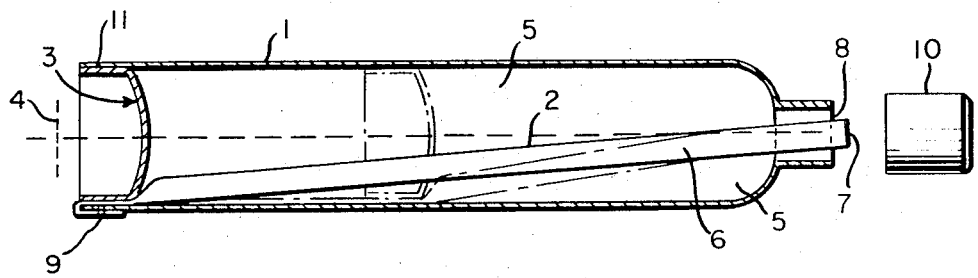

FIG. 1 is a side view of a preferred embodiment of the invention. Therein is shown a hollow casing 1, one end of which has been necked down to form the casing-dispensing orifice 8 that is smaller in size than the hollow space in the casing. (Note however, that if the hollow in the casing is of a size that is suitable for an orifice, the casing need not be necked down.) The other end of the casing is open, thus forming the casing orifice 11.

A flexible duct 2 is longitudinally disposed inside the casing 1. One end of the flexible duct 2 is sealed and attached to the casing 1 at position 9. The other end of the flexible duct 2 is open, thus forming the duct-dispensing orifice 7 which is inserted in the casing-dispensing orifice 8.

A plunger 3 is inserted in the casing orifice 11. The plunger 3 has its outer periphery in close proximity to inside walls of the casing so as to form a seal therewith. A plunger moving means 4 is situated behind the plunger 3 so as to be capable of advancing the plunger 3 toward the casing-dispensing orifice 8 and the duct-dispensing orifice 7. Suitable plunger moving means include the use of a pushrod or if the casing is of the proper size and shape, a standard caulking gun that is known in the art.

In the above-described device, one type of extrudible material 5 can be contained in the casing 1 and another type of extrudible material 6 can be contained in the flexible duct 2.

A covering means 10 is provided to cover and seal the casing-dispensing orifice 8 and the duct-dispensing orifice 7. Suitable covering means include the use of a screwcap, a cap that is held in place by a friction fit, or a film of sealant material, such as, for example, polyethylene, etc.

Figure 2:
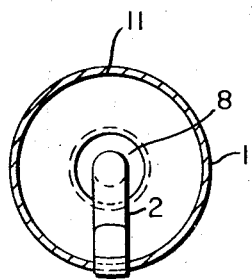

FIG. 2 is an end view of the above-described preferred embodiment. Therein is shown the casing orifice 11 wherein the plunger 3 will be inserted. For the purpose of illustrating the attachment of the flexible duct 2 to the casing 1, however, this view shows the device without the plunger 3.

When it is desired to dispense extrudible materials that are contained in the above-described device, the covering means 10 is removed. In operation, moving means 4 is employed to cause plunger 3 to be advanced toward casing-dispensing orifice 8 and duct-dispensing orifice 7 thereby (a) compressing flexible duct 2 and causing the expulsion of the extrudible material 6 contained therein through the duct-dispensing orifice 7 and (b) causing the expulsion of the extrudible material 5 contained in the casing 1 through the casing-dispensing orifice 8. This process of expulsion is shown more clearly by the dashed lines in FIG. 1 which represent the position of the components of the device after plunger 3 has been moved toward casing-dispensing orifice 8 and duct-dispensing orifice 7 to cause the expulsion of a portion of the materials.

Naturally, if it is desired to dispense more than two extrudible materials or if it is desired to dispense a greater amount of material than can be contained in one flexible duct, more than one flexible duct may be employed.

The device of this invention can be constructed of any suitable material. For example, the casing can be constructed of metal, plastic, glass, cardboard treated to resist absorption of the materials to be dispensed, foil-covered cardboard, etc. The flexible duct can be constructed of any flexible material that is capable of being compressed due to action of the plunger, i.e., polyethylene, polytetrafluoroethylene, or other suitable plasticlike material. The plunger can be constructed of any suitable material that is capable of forming an adequate seal against the inside walls of the casing and has enough rigidity that it is capable of compressing the flexible duct, such as, for example, rubber, plastic, metal, etc.

A wide variety of materials can be dispensed from the device of this invention. These materials can be characterized as being extrudible, i.e., they are liquids, solids dispersed in liquids, pastelike or plasticlike, etc. and have a low enough viscosity that they can be expelled from the device of this invention.

EXAMPLE 1

A package-dispensing device similar to that illustrated in the above drawing, was constructed of the following materials:
casing - polyethylene tube
flexible duct - "Teflon" (registered trademark of E. I. du Pont de Nemours and Company) polytetrafluoroethylene tube
plunger - polyethylene When the polyethylene tube was filled with a polyester putty useful for repairing automobile bodies and the "Teflon" polytetrafluoroethylene tube was filled with benzoyl peroxide paste curing agent, it was found that the above materials were (a) conveniently separately contained and (b) accurately dispensed when the plunger was moved toward the dispensing orifices.

EXAMPLE 2

Example 1 can be repeated using a casing constructed of a foil-lined cardboard tube to obtain equally desirable results.

The invention claimed is:

1. A device capable of containing and dispensing a plurality of separate extrudible materials which comprises:
   a. a hollow casing having an orifice at each end;
   b. at least one flexible duct being longitudinally disposed inside the casing, one end of said duct being sealed and attached to the casing at a point near one of the orifices of the casing, and the other end of said duct having an orifice which is inserted in the other orifice of the casing;
   c. a plunger that is inserted in the orifice of the casing near which the duct is attached, said plunger having its outside periphery in close proximity to the inside walls of the casing so as to form a seal therewith; and
   d. means capable of moving said plunger to the opposite end of the casing thereby simultaneously (1) causing the expulsion of the extrudible materials contained in the casing and (2) compressing the flexible duct and causing the expulsion of the extrudible materials contained therein.

2. The device of claim 1 wherein there is only one flexible duct inside the casing.

3. The device of claim 1 wherein the orifice of the casing through which the flexible duct is inserted in necked down to form an orifice that is smaller in size than the hollow in the casing.

4. The device of claim 3 wherein there is a removable covering means over the orifices through which the extrudible materials are dispensed.

* * * * *